Sept. 13, 1955 E. P. TURNER 2,717,967
ACTUATING MECHANISMS FOR ELECTRIC CLUTCH-BRAKE MOTORS
Filed Dec. 12, 1952 4 Sheets-Sheet 1

WITNESS
Nicholas Leozczak

INVENTOR.
Edgar P. Turner
BY
ATTORNEY

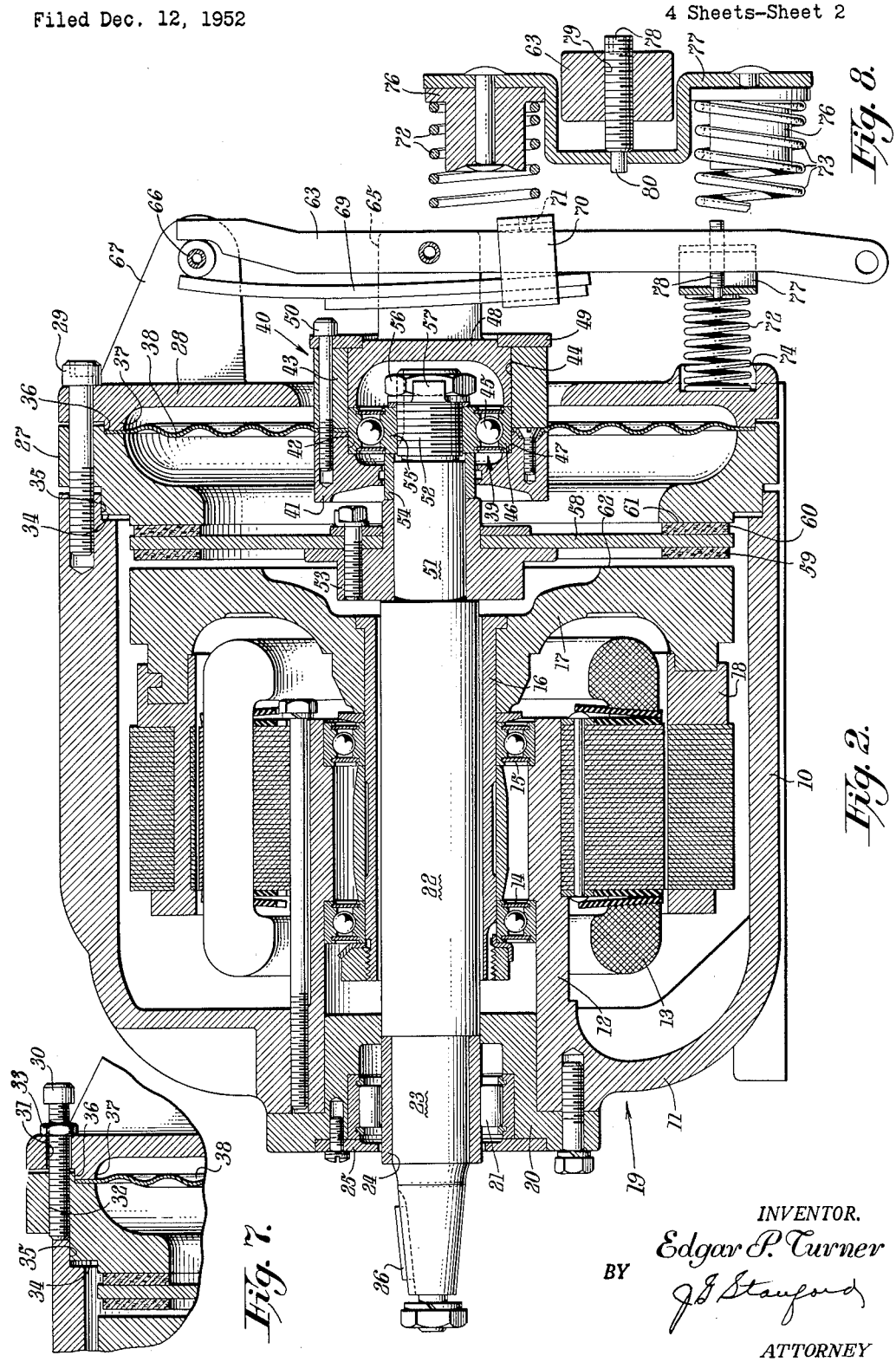

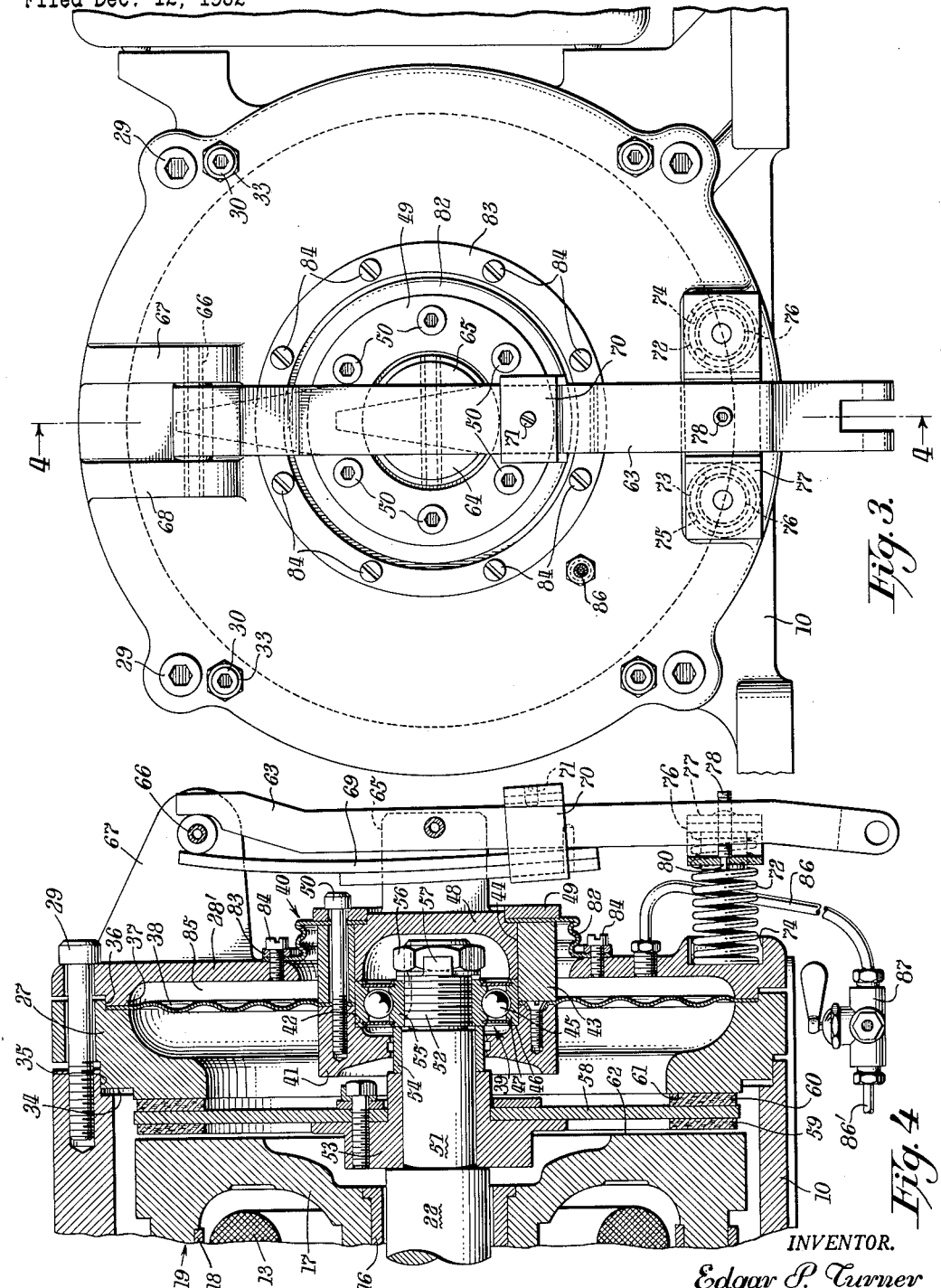

Sept. 13, 1955        E. P. TURNER        2,717,967
ACTUATING MECHANISMS FOR ELECTRIC CLUTCH-BRAKE MOTORS
Filed Dec. 12, 1952        4 Sheets-Sheet 4
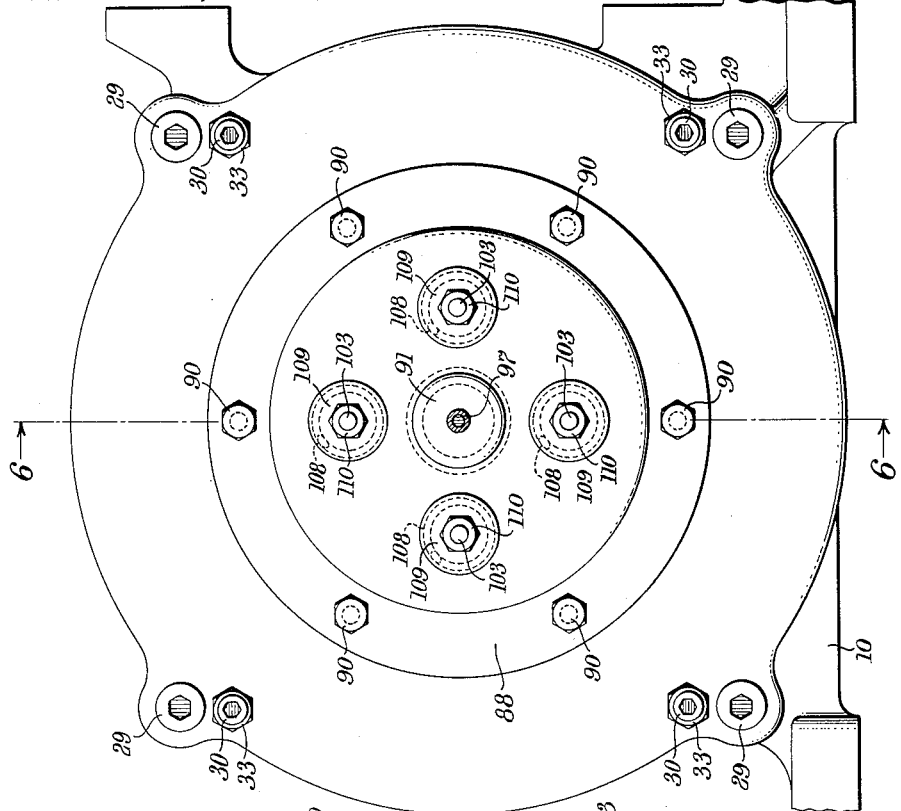
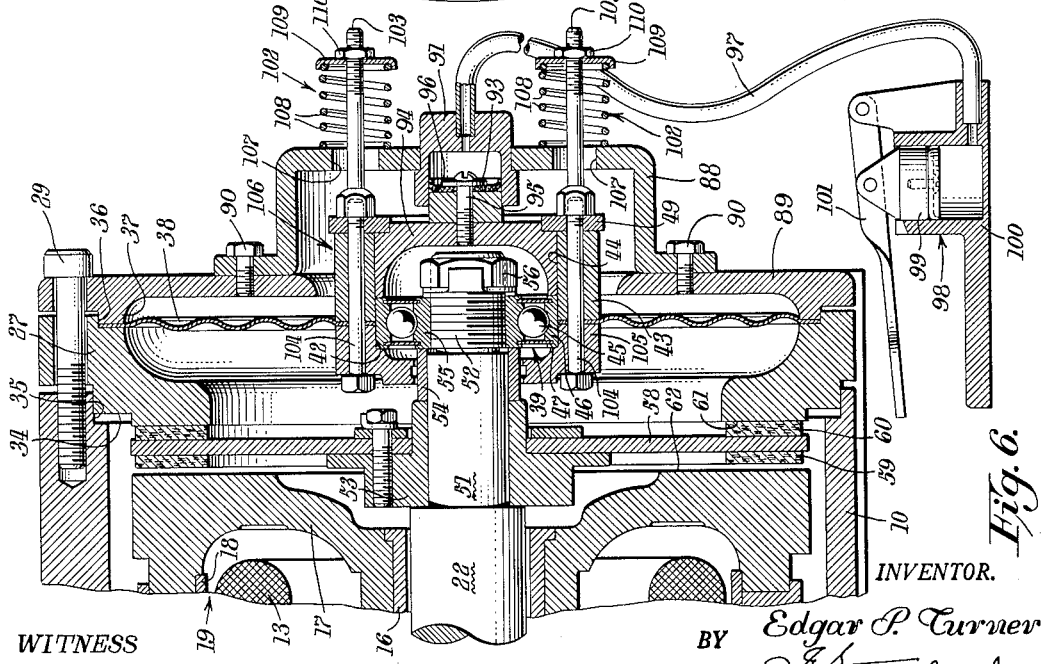
INVENTOR.
Edgar P. Turner

United States Patent Office 2,717,967
Patented Sept. 13, 1955

2,717,967

ACTUATING MECHANISMS FOR ELECTRIC CLUTCH-BRAKE MOTORS

Edgar P. Turner, Fanwood, N. J., assignor to The Singer Manufacturing Company, Elizabeth, N. J., a corporation of New Jersey Application December 12, 1952, Serial No. 325,583

23 Claims. (Cl. 310—76)

This invention relates to electric clutch-brake motors or power transmitters connected to a heavy load which must be repeatedly started and stopped. The invention relates more particularly to heavy duty clutch-brake motors provided with an axially movable driven shaft wherein at least one end of the shaft is mounted in an axially movable control bearing.

An object of this invention is to provide a flexible bearing support for at least one bearing which supports and controls the axial movement of a driven shaft.

Another object of the invention is to provide a clutch-brake motor which is sealed against dirt.

A further object of the invention is to provide a clutch and brake control mechanism which is easy to operate and service.

A still further object of the invention is to provide a fluid pressure operated actuating device for the clutch and brake mechanism.

A further object of the invention is to provide a readily adjustable brake adjusting means and brake engaging means.

In the drawings, Fig. 1 is an end view in elevation of a clutch-brake motor including one embodiment of my invention.

Fig. 2 is a partial sectional view of the motor shown in Fig. 1, taken substantially on line 2—2.

Fig. 3 is an end view in elevation of a clutch-brake motor including a second embodiment of my invention.

Fig. 4 is a partial sectional view of the motor shown in Fig. 3 taken substantially on line 4—4 of Fig. 3.

Fig. 5 is a vertical end view partly in section of a clutch brake motor including a third embodiment of my invention.

Fig. 6 is a partial sectional view taken substantially on line 6—6 of Fig. 5.

Fig. 7 is a view partly in section taken substantially on line 7—7 of Fig. 1 showing a clutch and brake adjusting device.

Fig. 8 is a view partly in section taken substantially on line 8—8 of Fig. 1 showing a brake spring adjusting device.

Figure 1:
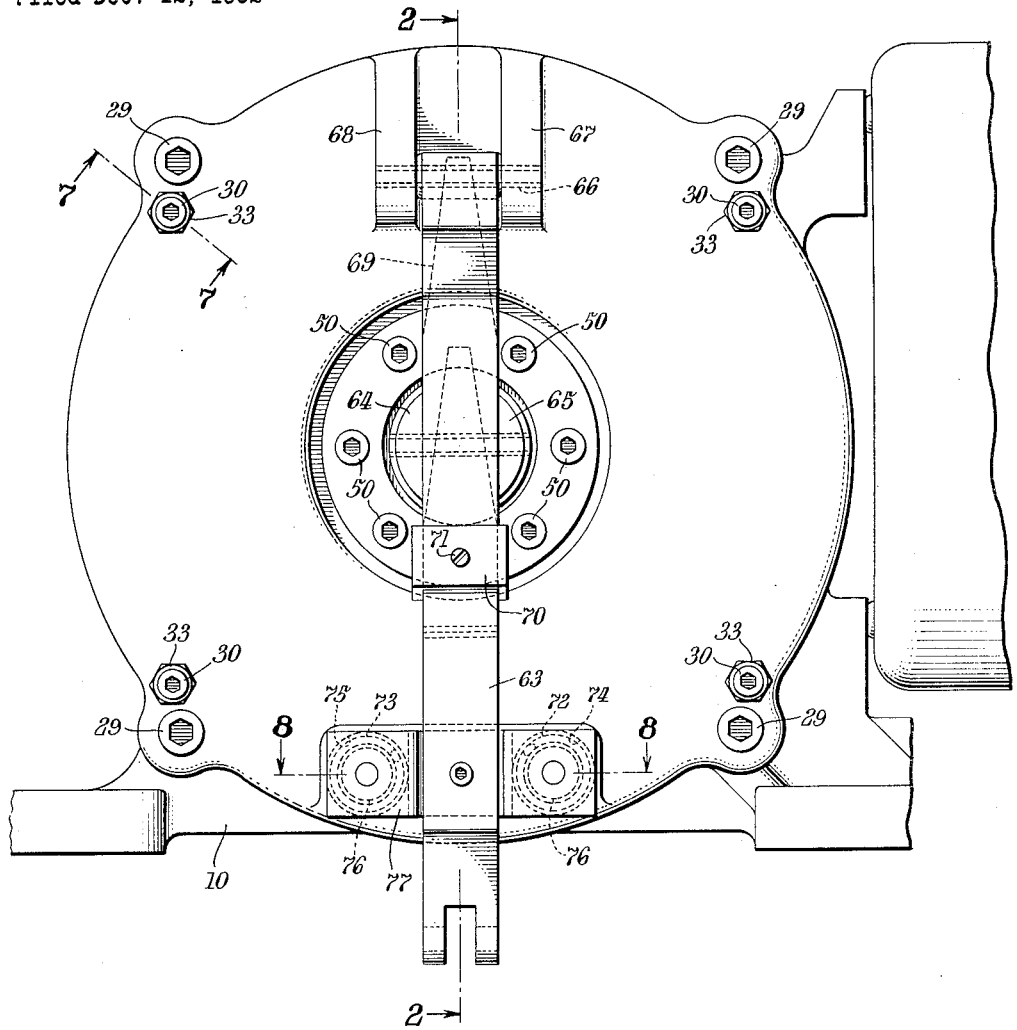

Referring more specifically to the drawings, one embodiment of my invention shown in Figs. 1 and 2 comprises a substantially cylindrical frame or casing 10 formed with an integral end-closure bell 11 at one end. A tubular support 12 extends into the casing 10 and carries a motor stator 13. Two anti-friction bearings 14 and 15 are secured in the bore of the tubular support 12 and rotatably support a sleeve shaft 16 which is rigidly secured to a motor rotor 17 having a cylindrical portion 18 concentric with the stator 13. This structure forms a complete motor assembly 19. The outer end of the bore in the tubular support 12 is partially closed by a cap 20 which is secured to the casing 10 and carries the outer race of a roller bearing 21. A driven shaft 22 is provided with a reduced diameter portion 23 which is pressed into the inner race 24 of the bearing 21. A sealing plate 25 is secured to the cap 20 to hold the bearing 21 in place and also to prevent dirt from entering the bearing 21. The left end of the shaft 22, as viewed in Fig. 2, is tapered and provided with a key 26 to receive a driven gear (not shown).

The right hand end of the casing 10, as viewed in Fig. 2, carries a brake ring 27 and a protective cover or backing ring 28. Four screws 29 extend through clearance holes in the brake ring 27 and the backing ring 28 and are threaded into the casing 10 to hold the brake ring and backing ring firmly in place on the end of the casing 10. Four brake adjusting screws 30 are equally spaced around the backing ring 28 and pass through clearance holes 31 in the backing ring 28 as clearly shown in Fig. 7. The screws 30 are threaded through threaded holes 32 in the brake ring 27 to engage the end surface of the casing 10. Lock nuts 33 hold the screws 30 in their adjusted positions. The brake ring 27 is provided with a pilot portion 34 which enters a counterbore 35 in the end of the casing 10 to maintain the brake ring 27 concentric with the casing 10. A counterbore 36 is formed in the outer face of the brake ring 27 and receives an annular lip 37 formed on the backing ring 28. A flexible diaphragm 38 has its outer edge positioned in the counterbore 36 and is securely clamped in place by the lip 37 on the backing ring 28. The diaphragm may be made from any relatively thin sheet material, such as steel or copper and is corrugated, as shown in the drawings, to provide greater flexibility. A circular center opening is provided in the diaphragm substantially concentric with the corrugations to permit an anti-friction bearing 39 to be placed concentric with the corrugations.

A control bearing assembly for moving the shaft 22 axially comprises a bearing holder cup assembly 40 fastened to the bearing 39 and the center portion of the diaphragm 38. The cup assembly 40 comprises a base portion 41 having a bearing receiving bore 42; the base portion 41 being securely fastened to one side of the diaphragm 38. A guide and clamping ring 43 is positioned against the other side of the diaphragm 38 and is provided with a center bore 44 which is coaxial with and of the same diameter as the bore 42 in the base portion 41. The ball bearing 39 is provided with rolling elements 45 positioned in the bores 42 and 44 and has an outer race 46 seated against a shoulder 47 in the base portion 41. The bore 44 in the ring 43 receives a control cap 48 which is held against the outer race 46 of the bearing 39 by a retainer ring 49. Long screws 50 pass through the retainer ring 49, clamping ring 43 and diaphragm 38 and are threaded into the base portion 41 to hold the cup assembly 40 tightly together. This construction holds the bearing 39 securely positioned with respect to the diaphragm 38. Further, it should be noted that a plane passing through the edge of the central opening in the diaphragm 38 also passes through the center of each of the rolling elements 45 of the bearing 39. The driven shaft 22 is provided with a reduced diameter portion 51 and a threaded portion 52 on its right end, as viewed in Fig. 2. A hub 53 and spacing sleeve 54 are positioned on the shaft portion 51. The bearing 39 is provided with an inner race 55 which is positioned on the threaded portion 52 of the shaft 22 and held firmly against the sleeve 54 by a nut 56 and lock-washer 57. Thus, the bearing 39 and the holder cup assembly 40 cannot move axially relative to the shaft 22. A disc 58 is fastened to the hub 53 and carries a clutch facing 59 on one side and a brake facing 60 on the other side. The brake facing 60 is engageable with a stationary brake surface 61 on the brake ring 27 and the clutch facing 59 is engageable with a clutch surface 62 on the rotor 17.

The driven shaft 22 can be moved axially by means of an actuating mechanism disposed at the right end of the motor as viewed in Fig. 2. The control or actuating mechanism comprises a lever 63 which is pivotally fastened to two ears 64 and 65 formed on the control cap 48. One end of the lever engages a pin 66 carried by two bosses 67 and 68 formed on the backing ring 28. A leaf type spring 69 has one end secured to the lever 63 by a clamp 70 and screw 71 and the other end of the spring engages the pin 66 approximately diametrically opposite to the end of the lever 63. Two brake springs 72 and 73 are seated in sockets 74 and 75, respectively, formed in the backing ring 28 and engage pilot studs 76 fastened to a cross member 77. The cross-member 77 and springs 72 and 73 are located with one spring engaging the cross-member on each side of the lever 63. An adjusting screw 78 passes through a threaded hole 79 in the lever 63 and has a pilot end portion 80 engaging the cross-member 77. The pilot studs 76 and the pilot end portion 80 of the brake spring adjusting screw 78 hold the springs 72 and 73 in their correct positions with respect to the lever 63.

It is believed that the operation and advantages of the first embodiment of my invention will now be readily understood. The lower end of the actuating lever 63 is connected to an operating device (not shown) through suitable connections by which the lever 63 may be moved about its pivot. Since the lever 63 is pivotally connected to the control cap 48 which is held against axial movement relative to the driven shaft 22, any movement of the lever 63 about the fulcrum pin 66 will also cause axial movement of the driven shaft 22. Normally, the springs 72 and 73 urge the lower end of the lever 63 to the right as shown in Fig. 2, causing the driven shaft 22 to be urged to the right to engage the brake facing 60 with the brake surface 61. When it is desired to engage the clutch facing 59 with the clutch surface 62 on the rotor 17, the lower end of the lever 63 is moved to the left against the force of the springs 72 and 73 to move the shaft 22 axially to the left, thus disengaging the brake elements 60 and 61 and engaging the clutch elements 59 and 62. Broadly, the operation described above is old, but several features of the construction are new and of great advantage.

The flexible diaphragm type of bearing support provides a simple and efficient bearing support which permits easy operation of the transmitter. In previous transmitters of this general type, it has been necessary to slidably support the cup assembly 40 in a motor end closure bell in a manner similar to that shown in the copending U. S. patent application Serial No. 268,597, filed January 28, 1952, of L. A. Wendel. In my device, the sliding surfaces are eliminated by using the flexible diaphragm type of bearing support. The outer edge of the diaphragm 38 is firmly clamped between the brake ring 27 and the backing ring 28 and the inner edge is firmly clamped between the bearing cup base portion 41 and the clamping ring 43. Since the control cap 48 completely closes the outer end of the bearing support cup assembly 40, the end of the transmitter is completely sealed, eliminating any possibility of dirt entering the transmitter from the control end. The flexibility of the diaphragm 28 permits sufficient axial movement of the bearing 39 and the driven shaft 22 to obtain proper operation of the clutch and brake. Further, since the diaphragm 38 tends to return to its unflexed position from a flexed position, the diaphragm 38 itself can be used to supply some of the brake engaging force to assist the springs 72 and 73. It is important that the diaphragm 38 is fastened to the bearing support cup assembly 40 in such a manner that a plane through the edge of the center opening in the diaphragm passes through the centers of the rolling elements 45. If the diaphragm is not so attached, the radial load transmitted on the rolling elements 45 is concentrated on the outer race 46 to one side of the diaphragm. Such a condition causes the bearing 39 to twist out of alinement and results in undue wear of the bearing 39 and its eventual failure. Of course, in the event that the bearing 39 or shaft 22 should be misaligned, the corrugated diaphragm flexes to compensate for the misalignment, thus preventing immediate binding and failure. The corrugations in the diaphragm are very important for this reason because the corrugated diaphragm will flex more than a flat disc diaphragm and will withstand repeated flexing without fracturing. While it may appear that a corrugated diaphragm, such as diaphragm 38, will not support any substantial radial load in compression or tension the diaphragm will in fact support a very substantial load in shear.

The flexible diaphragm type of bearing mounting also makes it possible to provide a control assembly and brake and clutch adjusting means which can be removed from the casing 10 as an assembled unit without disturbing any of the clutch and brake or control adjustments. Once the entire unit is assembled and before the screws 29 are tightened, the clutch and brake are adjusted by turning the screws 30. Since the screws 30 are threaded into the brake ring 27 and bear against the end of the casing 10, the adjustment of the screws 30 determines the distance between the brake surface 61 and the clutch surface 62, thus determining the maximum movement required of the shaft 22 to move from its clutch engaged to its brake engaged position. After this adjustment is made, the lock nuts 33 are set and the screws 29 tightened to hold the mechanism firmly in place. After this adjustment has once been made, the screws 29 can be removed and the entire control mechanism and driven shaft removed from the casing 10 as an assembled unit without disturbing any of the previous adjustments. The brake ring 27 and the backing ring 28 are firmly held together by the screws 30 and lock nuts 33 and, since the flexible diaphragm 28 is clamped between the two rings 27 and 28, the bearing support cup assembly 40 and driven shaft can be moved axially to the right, as viewed in Fig. 2, and the entire assembled unit removed. The outside diameter of the inner roller-bearing race 24 is made small enough to slide through the center bore of the bearing cup 20 both for normal operation and assembly. Assuming that it is not necessary to disturb the screws 30, upon reassembling the mechanism, it is only necessary to tighten the screws 29 and the mechanism is ready for operation without further adjustment. It should be noted that while the unit is disassembled, the brake facing 60 is held firmly against the brake surface 61 on the ring 27 by the brake springs 72 and 73. However, should it be necessary to remove the springs 72 and 73 or the lever 63, the spring force of the diaphragm 28 tending to remain in its unflexed position holds the brake surfaces engaged to prevent the driven shaft 22 from being damaged by accidentally dropping out of the assembly.

The brake engaging pressure can be readily adjusted by turning the brake spring adjusting screw 78. Turning the screw 78 compresses and releases the springs 72 and 73 by changing the distance between the cross-member 77 and the backing ring 28. The leaf spring 69 limits the amount of clutch engaging pressure which can be applied. When too much clutch engaging pressure is applied to the lever 63, the spring 69 yields and thus prevents damage to the clutch and other parts.

From the above description, it is believed to be readily apparent that the first embodiment of my invention provides a heavy duty electric power transmitter which is compact, sturdy, and readily serviced. The flexible diaphragm bearing support makes it possible to completely seal the control end of the transmitter and also makes it possible to remove the entire actuating and brake mechanism from the transmitter casing without disturbing the clutch and brake adjustment. Further, it is believed to be obvious that the left end of the driven shaft 22, as viewed in Fig. 2, can also be supported by a flexible diaphragm and bearing support cap assembly similar to the arrangement shown at the right end of shaft 22.

A second embodiment of my invention is shown in

Figs. 3 and 4. This embodiment is similar in general construction to the first embodiment and the same numerals have been used to designate similar parts. It is believed to be necessary to describe only the structure which is different from that shown in the first embodiment. The transmitter shown in Figs. 3 and 4 differs from the embodiment shown in Figs. 1 and 2 in that a fluid control device is provided to control the engagement of the clutch and brake. A bellows 82 of the Sylphon type has one end clamped between the clamping ring 43 and the retainer ring 49 and the other end clamped to the backing ring 28' by a clamping ring 83 and screws 84. The space 85 between the diaphragm 38 and the backing ring 28' forms a fluid tight chamber into which fluid under pressure can be introduced and exhausted, through tubes 86 and 86' and a control valve 87. The tube 86' can be connected to any suitable source of fluid under pressure (not shown).

In operation, when the valve 87 is set to admit fluid under pressure into the chamber 85, the force of the fluid causes the diaphragm 28 to flex toward the left as viewed in Fig. 4, moving the shaft 22 also to the left until the clutch facing 59 engages the clutch surface 62. Of course, the movement of the shaft 22 to the left causes corresponding movement of the bearing support cup assembly 40 drawing the lever 63 against the force of the springs 72 and 73. When the valve 87 is moved to cut off the fluid pressure supply and exhaust the chamber 85, the compressed springs 72 and 73 move the lever 63 and the driven shaft 22 to engage the brake facing 60 with the brake surface 61. The brake and clutch clearance is adjusted in the same manner as described in connection with the first embodiment and, also, the actuating assembly and driven shaft 22 can be removed from the casing 10 as an assembled unit in a similar manner. This second embodiment includes all of the advantages of the first embodiment plus the advantage of a fluid actuated control device which can be controlled from a remotely located valve device. It is understood that any suitable valve device can be used for the valve 87. It should be noted that the seal 82 is sufficiently flexible to permit the bearing 39 to align itself by flexing the diaphragm 38, if necessary, with a minimum of resistance being offered by the seal 82.

Of course, it will be apparent that with minor valve changes, the tube 86 can be alternately connected to a source of fluid pressure and a vacuum, whereby the clutch is engaged by fluid pressure and the brake is engaged when the tube 86 is connected to the vacuum. Further, only minor modifications are required to place a seal similar to the bellows 82 between the bearing cup 41 and the brake ring 27 and introduce fluid pressure through suitable valve means on the right of the diaphragm 38, as viewed in Fig. 4, whereby both the clutch and the brake can be engaged and released by fluid pressure means. Obviously, the actuating lever 63 and the brake springs 72 and 73 can be eliminated in both of the above constructions.

The third embodiment of my invention, shown in Figs. 5 and 6, is similar in general construction to the embodiments shown in Figs. 1–4 inclusive and the same numerals have been used to identify similar parts. The primary difference between the first two embodiments and this third embodiment is in the fluid control mechanism which is particularly adapted for hydraulic operation. A flanged support cap 88 is fastened to the backing ring 89 by screws 90 which pass through the flange of the cap 88. A hydraulic cylinder 91 is fastened securely in a central opening in the cap 88. A piston 92 and packing washer 93 are disposed within the cylinder 91 and are fastened to the control cap 94 by a screw 95 and a washer 96. Fluid is introduced into the cylinder 91 through a tube 97 fastened to the end of the cylinder 91. Pressure can be applied to fluid in the tube 97 and cylinder 91 by a master cylinder 98 fastened to the tube 97. The master cylinder 98 comprises a piston 99 fitted in a cylinder body 100 and pivotally fastened to a lever 101 which is pivoted to the master cylinder body 100. Four brake spring assemblies 102 are equally spaced around the cylinder 91 and normally hold the brake surfaces engaged. The spring assemblies each comprise a stud 103 which is threaded onto the end of a bolt 104 extending through the bearing cup 105, diaphragm 28 and rings 43 and 49. The studs 103 and bolts 104 clamp the bearing support cup assembly 106 firmly together. Each stud 103 protrudes through a clearance hole 107 in the support cap 88 and is surrounded by a coil spring 108 having one end resting on the support cap 88 and the other end engaging a washer 109 adjustably held on the stud 103 by a nut 110.

The operation of this embodiment is similar to the operation of the second embodiment. Assuming that the lever 101 and the piston 99 are raised as shown in Fig. 6, and the cylinders 91 and 100 and tube 97 are full of liquid, the springs 108 hold the cup assembly 106 and driven shaft 22 as shown in Fig. 5, with the brake facing 60 in engagement with the brake surface 61. When a force is applied to the lever 101 to urge the piston 99 downwardly, the force is transmitted through the fluid to the cylinder 91 to urge the piston 92 to the left, as shown in Fig. 6 to engage the clutch facing 59 with the clutch surface 62. Upon release of the force from the lever 101, the springs 108 cause the clutch to disengage and the brake to engage.

It is believed to be obvious that the clutch and brake can be adjusted and the brake and control mechanism removed as an assembled unit in the same manner as described in the first embodiment of my invention.

From the above description, it is believed that the many advantages of this invention are readily apparent. I have provided an electric power transmitter which is totally enclosed but which can be readily opened for inspection and service without disturbing pre-set control adjustments. Further, no sliding surface is required between the control bearing support assembly and the transmitter casing. Also, the flexible diaphragm type of construction permits the transmitter to be readily adapted to different types of control mechanism with only minor changes in construction.

Having thus set forth the nature of the invention, what I claim herein is:

1. An electric power transmitter comprising a frame, a stator carried by said frame, a rotor concentric with said stator and rotatably carried by said frame, a flexible diaphragm carried by said frame, an anti-friction bearing having inner and outer race members and interposed rolling elements, said diaphragm being secured to said outer race member midway of said roller elements, a driven shaft journaled in said bearing and fixed against axial movement relative thereto, connecting means operable to connect said driven shaft to said rotor upon axial movement of said shaft in one direction, and actuating means for flexing said diaphragm and moving said bearing axially to actuate said connecting means.

2. An electric power transmitter comprising a frame, a stator and a rotor carried by said frame, a flexible diaphragm carried by said frame, an anti-friction bearing having inner and outer race members and interposed rolling elements, said diaphragm being secured to said outer race member midway of said roller elements, a driven shaft journaled in said bearing and fixed against axial movement relative thereto, connecting means operable to connect said driven shaft to said rotor upon axial movement of said shaft in one direction, and a lever carried by said frame and operatively connected to said bearing to move said bearing axially.

3. An electric power transmitter comprising a frame, a stator carried by said frame, a rotor concentric with said stator and rotatably carried by said frame, a flexible diaphragm carried by said frame, an anti-friction bearing having inner and outer race members and interposed rolling elements, said diaphragm being secured to said outer race member midway of said roller elements, a driven shaft journaled in said bearing and fixed against axial movement relative thereto, connecting means operable to connect said driven shaft to said rotor upon axial movement of said shaft in one direction, a cylinder carried by said frame, a movable piston fitted in said cylinder and operatively connected to said bearing, and means for introducing fluid under pressure into said cylinder.

4. An electric power transmitter comprising a frame, a stator carried by said frame, a rotor concentric with said stator and rotatably carried by said frame, a flexible diaphragm carried by said frame, an anti-friction bearing having inner and outer race members and interposed rolling elements, said diaphragm being secured to said outer race member midway of said roller elements, a driven shaft journaled in said bearing and fixed against axial movement relative thereto, connecting means operable to connect said driven shaft to said rotor upon axial movement of said shaft in one direction, a fluid-tight actuating chamber having said diaphragm as one wall, and means for introducing fluid under pressure into said chamber.

5. An electric power transmitter comprising, a frame, a stator carried by said frame, a rotor concentric with said stator and rotatably carried by said frame, a flexible diaphragm having its outer edge carried by said frame, a bearing carried by said diaphragm, a driven shaft journaled in said bearing for radial support and fixed against axial movement relative thereto, a rigid backing member carried by said frame substantially parallel to said diaphragm, fluid tight sealing means between said backing member and said bearing, and means for introducing fluid under pressure between said backing member and said diaphragm.

6. An electric power transmitter comprising a frame, a stator carried by said frame, a rotor concentric with said stator and coacting therewith, a flexible diaphragm carried by said frame, an anti-friction bearing carried by said diaphragm, a driven shaft journaled in said bearing for radial support and operatively connectible to said rotor, said driven shaft being fixed against axial movement relative to said bearing, means forming a fluid chamber and having said diaphragm as one wall of said chamber, and means for introducing fluid under pressure into said chamber.

7. An electric power transmitter comprising a frame, a stator carried by said frame, a rotor concentric with said stator and rotatably carried by said frame, a flexible diaphragm carried by said frame, an anti-friction bearing carried by said diaphragm, a driven shaft journaled in said bearing for radial support and connectible to said rotor, said driven shaft being fixed against axial movement relative to said bearing, a fluid chamber having a movable wall operatively connected to said bearing, and means for introducing fluid under pressure into said chamber.

8. An electric power transmitter comprising a frame, a stator carried by said frame, a rotor concentric with said stator and rotatably carried by said frame, a flexible diaphragm carried by said frame, an anti-friction bearing carried by a central portion of said diaphragm, a driven shaft journaled in said bearing and fixed against axial motion relative thereto, connecting means between said rotor and said driven member, an actuating lever carried by said frame, and means operatively connecting said lever to said bearing and said diaphragm to flex said diaphragm and move said bearing axially.

9. An electric motor having a frame, a stator carried by said frame, a rotor rotatable relative to said stator, a flexible diaphragm carried by said frame, an anti-friction bearing having an outer and an inner race, said outer race being carried by a portion of said diaphragm, a rotatable driven element carried by said inner race, a clutch member carried by said driven element and engageable with said rotor, and actuating means operable to flex said diaphragm and to move said bearing axially.

10. An electric motor comprising a frame, a stator carried by said frame, a rotor coacting with said stator, a bearing supporting flexible diaphragm carried by said frame, an anti-friction bearing having inner and outer races and roller elements between said races, means securing said outer race to a central portion of said diaphragm, said diaphragm being fastened to said outer race approximately midway axially of said roller elements, a rotatable driven element journaled in said inner race, and means operatively connecting said rotor to said driven element.

11. An electric clutch-brake motor having a frame, a stator carried by said frame, a rotor concentric with said stator, an axially movable driven shaft coaxial with said rotor, connecting means for operatively connecting said driven shaft to said rotor upon axial movement of said shaft in one direction, a flexible diaphragm carried by said frame, a bearing secured to a central portion of said diaphragm and radially supporting said driven shaft for rotation, said bearing being fixed against axial motion relative to said shaft, and actuating means operatively connected to said bearing cup and operable to flex said diaphragm and move said driven shaft axially.

12. A driving mechanism comprising a frame, a driving element carried by said frame, a rotatable and axially movable driven shaft coaxial with said driving element, means operable to connect said shaft to said element upon axial movement of said shaft, a flexible diaphragm supported by said frame at its outer edge, an anti-friction bearing carried by said diaphragm and radially supporting said driven shaft, said diaphragm permitting axial movement of said shaft and said bearing cup, and means for moving said driven shaft axially.

13. An electric power transmitter comprising a frame, a stator carried by said frame, a rotor concentric with said stator and rotatably carried by said frame, a flexible diaphragm having its outer edge carried by said frame, an anti-friction bearing having outer and inner races and interposed rolling elements, means securing said outer race to said diaphragm in a plane which passes substantially through the mid-points of said roller elements, a rotatable driven shaft carried by said inner race, a clutch element carried by said driven shaft, a clutch member carried by said rotor and engageable by said clutch element, an actuating lever having one end carried by said frame, and means operatively connecting said bearing to said actuating lever.

14. An electric power transmitter comprising a frame, a stator carried by said frame, a rotor concentric with said stator and rotatably carried by said frame, a flexible diaphragm carried by said frame, an anti-friction bearing having outer and inner races and interposed rolling elements, means securing said outer race to said diaphragm in a plane which passes substantially through the mid-points of said roller elements, a rotatable driven shaft carried by said inner race, a clutch element carried by said rotor, a brake element carried by said frame, a clutch-brake member interposed between said clutch and brake elements and fastened to said driven shaft, an actuating lever having one end carried by said frame, and means operatively connecting said bearing to said actuating lever.

15. An electric power transmitter comprising a frame, a stator carried by said frame, a rotor concentric with said stator and rotatably carried by said frame, a diaphragm carried by said frame an anti-friction bearing having outer and inner races and interposed rolling elements, means securing said outer race to a central portion of said diaphragm in a plane passing substantially through the mid-points of said roller elements, a rotatable driven shaft carried by said inner race and fixed against axial movement relative thereto, a clutch element carried by said rotor, a brake element carried by said frame, a clutch-brake member interposed between said clutch and brake element and fastened to said driven shaft, fluid pressure actuating means for flexing said diaphragm and moving said shaft axially, and means for controlling fluid pressure to said actuating means.

16. An electric power transmitter comprising a frame, a stator carried by said frame, a rotor rotatably supported by said frame concentric with said stator, a driven shaft adapted to be rotated by said rotor, a brake ring coaxial with said frame and adapted to brake said driven shaft, a backing ring coaxial with said brake ring, a flexible diaphragm disposed between said rings, a control bearing assembly carried by said diaphragm and rotatably supporting said driven shaft, brake adjusting means engageable with said frame and securing said rings together with said diaphragm clamped between them, and means fastening said rings and said diaphragm to said frame.

17. An electric power transmitter comprising a substantially cylindrical frame having an open end, a stator carried by said frame, a rotor rotatably supported by said frame concentric with said stator, a driven shaft adapted to be rotated by said rotor, a brake ring coaxial with said frame, a flexible diaphragm supported by said brake ring, a control bearing assembly carried by said diaphragm and rotatably supporting said driven shaft, a brake adjusting screw threaded through said brake ring and engageable with the end of said frame, and fastening means securing said brake ring and diaphragm to said frame.

18. An electric power transmitter comprising a frame; a stator carried by said frame; a rotor rotatably supported by said frame concentric with said stator; a driven shaft adapted to be rotated by said rotor; brake means for stopping said driven shaft; brake adjusting means operatively associated with said brake means; a control bearing assembly rotatably supporting said driven shaft and fixed against axial movement relative thereto; a flexible diaphragm supporting said control bearing assembly; actuating means for moving said bearing assembly axially; means including said brake adjusting means securing said brake means, diaphragm, and actuating means together as a unit; and means securing said unit to said frame.

19. An electric power transmitter comprising a frame, a stator carried by said frame, a rotor concentric with said stator and rotatably carried by said frame, a flexible diaphragm carried by said frame, having a control bearing secured thereto, a driven shaft journaled in said bearing for radial support and fixed against axial motion relative thereto, connecting means operable to connect said driven shaft to said rotor upon axial movement of said shaft in one direction, and actuating means for flexing said diaphragm and moving said bearing axially to actuate said connecting means.

20. An electric power transmitter comprising a frame, a stator carried by said frame, a rotor carried by said frame and coacting with said stator, a driven shaft adapted to be rotated by said rotor, a bearing journally supporting said shaft, and a flexible diaphragm carried by said frame and supporting said bearing, said diaphragm being formed of thin sheet material having annular corrugations concentric with said bearing.

21. A dynamoelectric machine having a frame, a stator carried by said frame, a rotor concentric with said stator and rotatably carried by said frame, a driven member rotatably supported in said frame, an annular flexible disc concentric with said driven member and provided with annular corrugations, means securing the inner edge of said disc against axial movement relative to said driven member, an annular member secured to the outer edge of said diaphragm, said flexible diaphragm permitting relative axial movement between said driven member and said annular member, and means to cause relative axial movement between said driven member and said annular member.

22. A dynamoelectric machine having a frame, a stator carried by said frame, a rotor concentric with said stator and rotatably carried by said frame, a driven member rotatably supported in said frame concentric with said rotor and rotatable with respect thereto, engageable friction elements disposed coaxially relative to each other and concentric with said driven member, means securing said driven member against axial motion relative to one of said friction elements, an annular flexible diaphragm disposed concentric with said shaft and provided with annular corrugations, means securing the outer edge of said diaphragm to the other of said friction elements, means securing the inner edge of said diaphragm against axial movement relative to said driven member, and actuating means operatively connected to one of said friction elements and said diaphragm for flexing said diaphragm and moving said one of said elements axially, whereby said friction elements can be engaged and disengaged.

23. An electric power transmitter comprising a frame, a stator carried by said frame, a rotor concentric with said stator, an annularly corrugated flexible diaphragm carried by said frame, a rotatable and axially movable driven shaft carried by said flexible diaphragm concentric with said rotor, a clutch disc fastened to said driven shaft and engageable with said rotor, means for moving said driven shaft axially in one direction to engage said clutch, and in the opposite direction to disengage said clutch, a fluid pressure responsive device operatively connected to said means for controlling operation of said means, and pressure control means operatively connected to said pressure responsive means for varying the fluid pressure in said pressure responsive means.

References Cited in the file of this patent

UNITED STATES PATENTS

| | | |
|---|---|---|
| 1,679,890 | Baldwin | Aug. 7, 1928 |
| 2,039,128 | Tiedeman | Apr. 28, 1936 |
| 2,510,917 | Turner et al. | June 6, 1950 |
| 2,627,370 | Crum | Feb. 3, 1953 |

FOREIGN PATENTS

| | | |
|---|---|---|
| 712,690 | Germany | Oct. 31, 1941 |